(12) United States Patent
Maiden (10) Patent No.: US 9,086,570 B2
(45) Date of Patent: Jul. 21, 2015

(54) QUANTATIVE PHASE IMAGING MICROSCOPE AND METHOD AND APPARATUS PERFORMING THE SAME

(75) Inventor: Andrew Maiden, Sheffield (GB)

(73) Assignee: PHASE FOCUS LIMITED, Sheffield, South Yorkshire (GB)

( * ) Notice: Subject to any disclaimer, the term of this patent is extended or adjusted under 35 U.S.C. 154(b) by 777 days.

(21) Appl. No.: 13/264,349

(22) PCT Filed: Mar. 1, 2010

(86) PCT No.: PCT/GB2010/050349
§ 371 (c)(1),
(2), (4) Date: Jan. 18, 2012

(87) PCT Pub. No.: WO2010/119278
PCT Pub. Date: Oct. 21, 2010

(65) Prior Publication Data
US 2012/0105744 A1 May 3, 2012

(30) Foreign Application Priority Data

Apr. 15, 2009 (GB) .................................. 0906449.4

(51) Int. Cl.
*G02F 1/13* (2006.01)
*G02B 21/02* (2006.01)
*G02B 21/14* (2006.01)

(52) U.S. Cl.
CPC ................ *G02B 21/02* (2013.01); *G02B 21/14* (2013.01)

(58) Field of Classification Search
CPC ................ G09G 2330/021; G09G 2310/0297; G09G 2340/16; G09G 2360/16
USPC ........................................ 349/2; 359/389, 559
See application file for complete search history.

(56) References Cited

U.S. PATENT DOCUMENTS

| 3,503,662 | A | | 3/1970 | Grzelak et al. |
| 4,989,957 | A | | 2/1991 | Suzuki |
| 5,751,475 | A | * | 5/1998 | Ishiwata et al. ................ 359/387 |
| 5,856,886 | A | | 1/1999 | Kaizu |
| 8,004,762 | B2 | * | 8/2011 | Cathey et al. .................. 359/558 |
| 8,400,710 | B2 | * | 3/2013 | Terakawa et al. .............. 359/389 |

FOREIGN PATENT DOCUMENTS

| DE | 10 2005 023 850 | 11/2006 |
| EP | 1 865 353 | 12/2007 |
| GB | 885224 | 12/1961 |
| WO | 02099511 | 12/2002 |
| WO | 2004102958 | 11/2004 |
| WO | 2005106531 | 11/2005 |
| WO | 2006125975 | 11/2006 |

OTHER PUBLICATIONS

International Search Report from International Application No. PCT/GB2010/050349 mailed Jan. 9, 2010.

* cited by examiner

*Primary Examiner* — Huyen Ngo
(74) *Attorney, Agent, or Firm* — Lando & Anastasi, LLP (57) ABSTRACT

A method and apparatus are disclosed for generating a plurality of scattered radiation patterns at an image plane of an optical microscope. The apparatus includes at least one lens element, a liquid crystal display (LCD) array, and a housing comprising a body portion supporting the LCD array and lens element in a predetermined spaced apart relationship. The LCD array comprises a plurality of pixel elements arranged in a grid layout, said array being connectable to a processing element adapted to selectively control a transmittance of each pixel in the grid layout.

18 Claims, 5 Drawing Sheets

FIG. 1

PRIOR ART

FIG. 2

PRIOR ART

QUANTATIVE PHASE IMAGING MICROSCOPE AND METHOD AND APPARATUS PERFORMING THE SAME

The present invention relates to a method and apparatus for providing image data. In particular, but not exclusively, the present invention relates to an optical microscope and a method for modifying an optical microscope.

Conventional phase-contrast microscopy is not capable of delivering quantitative phase information since it measures only differential phase changes. Quantitative phase measurement is important as it can be interpreted as refractive index or thickness changes in a sample or some other such target object. Such factors are essential in the analysis of many interesting specimens. There are a number of existing methods for the measurement of quantitative phase in optical microscopes. Holographic interference methods are one, transport of Intensity (or TIE) methods are a second. Holographic methods suffer from exacting requirements on the path lengths and optical properties of the interference system and are not available as a simple 'add-on' to existing microscopes. A new machine must be purchased. The TIE method can be implemented as an 'add on' but requires the capture of at least two out of focus images whose defocus must be known exactly and the conditions for which must be generated by a linear translation stage (which typically moves the microscope objective lens).

A third method of quantitative phase imaging uses coherent diffractive imaging (CDI), where the scattering of light from the sample is used to reconstruct an image digitally, rather than lenses being used to form the image directly. One embodiment of this idea is the Pytchographical Iterative Engine (or PIE) in which the sample is translated and scatter (or diffraction) patterns recorded from each sample location. Advantages of this method are the possibility for large working distances, thanks to less stringent requirements on the quality of the lenses used, and a large field of view, thanks to the translation of the sample. Disadvantages are the high dynamic range of the scatter patterns (sometimes requiring multiple exposures of the recording device), the need for accurate computer-controlled positioning stages and the relatively long time needed to form an image. In addition, the illumination used in any CDI method must have at least a partial degree of coherence.

It is an aim of the present invention to at least partly mitigate the above-mentioned problems.

It is an aim of certain embodiments of the present invention to provide a method of providing image data suitable for subsequently constructing an image of a region of a target object.

It is an aim of certain embodiments of the present invention to provide a microscope or an add-on lens for a microscope which can be used to generate a plurality of scattered radiation patterns without a need to precisely control optical pathways or any additional moving parts.

It is an aim of certain embodiments of the present invention to provide scattering patterns for which recorded images do not have a large dynamic range.

According to a first aspect of the present invention there is provided apparatus for selectively generating a plurality of scattered radiation patterns at an image plane of an optical microscope, comprising:
  at least one lens element;
  a liquid crystal display (LCD) array; and
  a housing comprising a body portion supporting the LCD array and lens element in a predetermined spaced apart relationship.

According to a second aspect of the present invention there is provided a microscope, comprising:
  a source of optical radiation;
  a sample holder arranged to support a target object at a sample plane;
  an objective lens housing;
  a tube lens element; and
  a detector array for detecting an intensity of radiation scattered by the target object at an image plane; wherein
  the objective lens housing comprises a body portion supporting a liquid crystal display (LCD) array and at least one lens element in a predetermined spaced apart relationship.

According to a third aspect of the present invention there is provided a method of providing image data for constructing an image of a region of a target object, comprising the steps of:
  providing at least partially coherent optical radiation at a target object;
  via at least one detector, detecting an intensity of radiation scattered by the target object with a liquid crystal display (LCD) array, providing a first pixel pattern, located between the target object and the detector;
  subsequently, via the at least one detector, detecting an intensity of radiation scattered by the target object with the LCD array providing a further pixel pattern; and
  providing image data responsive to at least the intensity detected when the LCD array provides the first and further pixel patterns.

Certain embodiments of the present invention provide a method which requires neither precisely controlled optical pathways or additional moving parts.

Certain embodiments of the present invention provide recorded images which do not have a large dynamic range.

Certain embodiments of the present invention provide an objective lens arrangement which incorporates an LCD device therein. By selecting a pattern of on-off pixels of the LCD distinct scattering patterns can be detected in an image plane. The LCD displays a random series of "on" and "off" pixels with light incident at a location of an on pixel being passed through to the rest of the microscope and light incident at the location of an off pixel being blocked.

Embodiments of the present invention will now be described hereinafter by way of example only, with reference to the accompanying drawings, in which.

In the drawings like reference numerals refer to like parts.

It will be understood that the term target object refers to any specimen or item placed in the path of incident radiation which causes scattering of that radiation. It will be understood that the target object should be at least partially transparent to incident radiation. The target object may or may not have some repetitive structure.

It is to be understood that the term radiation is to be broadly construed as energy from an optical radiation source. Such radiation may be represented by a wave function $\Psi(r)$. This wave function includes a real part and an imaginary part as will be understood by those skilled in the art. This may be represented by the wave functions modulus and phase. $\Psi(r)*$ is the complex conjugate of Ψ(r) and Ψ(r), Ψ(r)*=|Ψ(r)|² where |Ψ(r)|² is an intensity which may be measured for the wave function.

Before discussing embodiments of the present invention, a brief introduction to a prior art apparatus, method and algorithm as disclosed in WO 2005/106531, which is incorporated herein in its entirety by reference for all purposes, will be provided. The embodiment of the prior art discussed is a moving aperture arrangement as disclosed in WO 2005/106531. However, it will be realised that a prior art method of moving a weakly focussing lens is also known and that embodiments of the present invention may also be used in conjunction with such an arrangement of weakly focussing lens.

Figure 1:
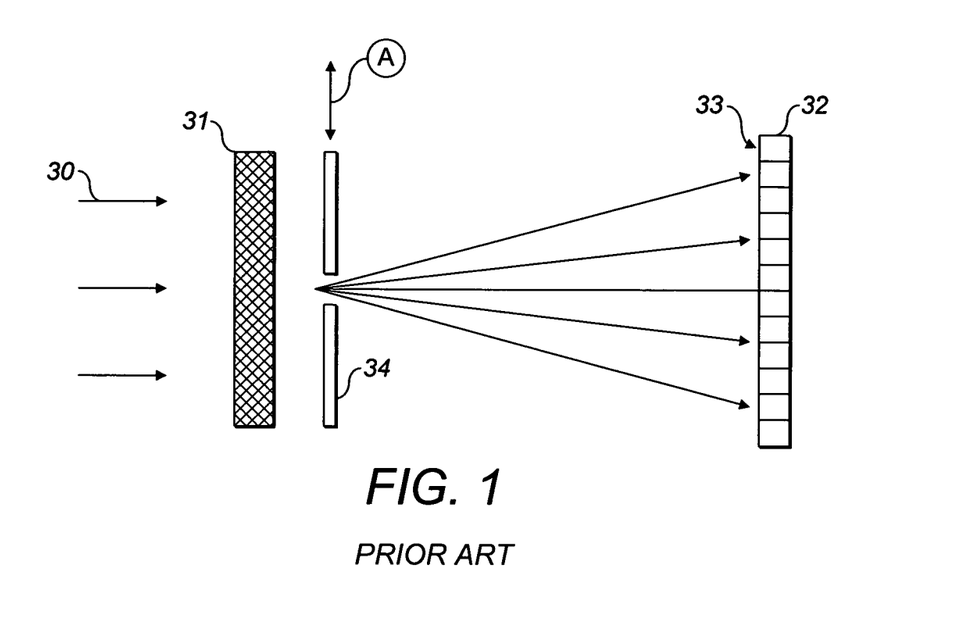
FIG. 1 illustrates a moving aperture arrangement known from the prior art.

Referring to FIG. 1, a prior art arrangement is shown in which incident radiation 30 is caused to fall upon a target object 31.

The incident radiation 30 is scattered as it passes through and beyond the target object 31. As such the wave function of the incident radiation as it exits the target object 31 will be modified in both amplitude and phase with respect to the wave function of the incident radiation at the pre-target side of the target object 31. The scattering which occurs may include Fourier diffraction, refraction and/or Fresnel diffraction and any other form of scattering in which characteristics of the incident radiation are modified as a result of propagating after the target object 31. If an array of detectors such as a CCD detector 32 is arranged a long distance from the target object 31 then a diffraction pattern is formed at a diffraction plane 33. A Fourier diffraction pattern will form if the detectors 32 are located a distance D from the target object 31 where D is sufficiently long for the diffraction pattern to be formed effectively from a point source. If the diffraction plane is formed closer to the target object 31, by locating the detectors nearer, then a Fresnel diffraction pattern will be formed. An aperture 34 is located post target object to thereby select a region of the target for investigation. The aperture is formed in a mask so that the aperture defines a "support". A support is an area of a function where that function is not zero. In other words outside the support the function is zero. Outside the support the mask blocks the transmittance of radiation. Apertures for use with the present invention need not be finite and sharply defined. They may be moveable and slowly varying at their edges. In this way the softly varying illumination function or transmittance is not composed of high spatial frequencies. In other words it is a bandwidth limited function. As no lens is used a large field of view may be measured by the detectors 32. The term aperture describes a localised transmission function of radiation. This may be represented by a complex variable in two dimensions having a modulus value between 0 and 1. An example is a mask having a physical aperture region of varying transmittance.

Figure 2:
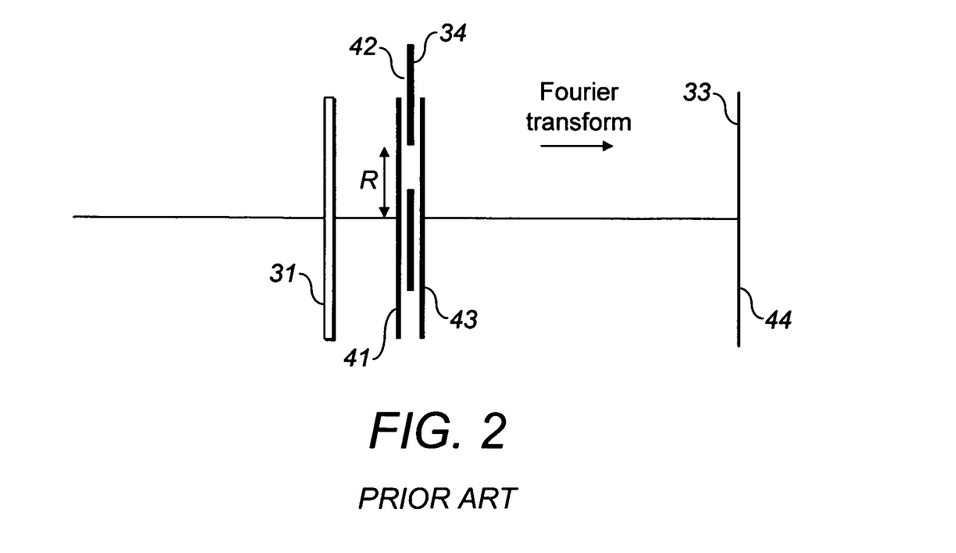
FIG. 2 shows an illustration of moving a post-target aperture known from the prior art.

FIG. 2 illustrates schematically the propagation of waves through the arrangement of FIG. 1. Incident radiation 30 falls upon the up-stream side of the target object 31 and is scattered by the target object 31 as it is transmitted. A target object wave O(r) is an exit wave function of radiation after interaction with the target object 31. In this way O(r) represents a two-dimensional complex function so that each point in O(r), where r is a two-dimensional coordinate, has associated with it a complex number. O(r) will physically represent an exit wave that would emanate from the target object 31 which is illuminated by a plane wave. For example, in the case of electron scattering, O(r) would represent the phase and amplitude alteration introduced into an incident wave as a result of passing through the target object 31 of interest. The aperture 34 provides a probe function P(r) (or filtering function) which selects a part of the object exit wave function for analysis. It will be understood that rather than selecting an aperture a transmission grating or other such filtering function may be located downstream of the object function. The probe function P(r−R) is an aperture transmission function where an aperture is at a position R. The probe function can be represented as a complex function with its complex value given by a modulus and phase which represent the modulus and phase alterations introduced by the probe into a perfect plane wave incident up it.

The exit wave function Ψ(r,R) 43 is an exit wave function of radiation as it exits the aperture 34. This exit wave Ψ(r,R) 43 forms a diffraction pattern Ψ(k,R) 44 at a diffraction plane 33. Here r is a vector coordinate in real space and k is a vector coordinate in diffraction space.

Figure 3:
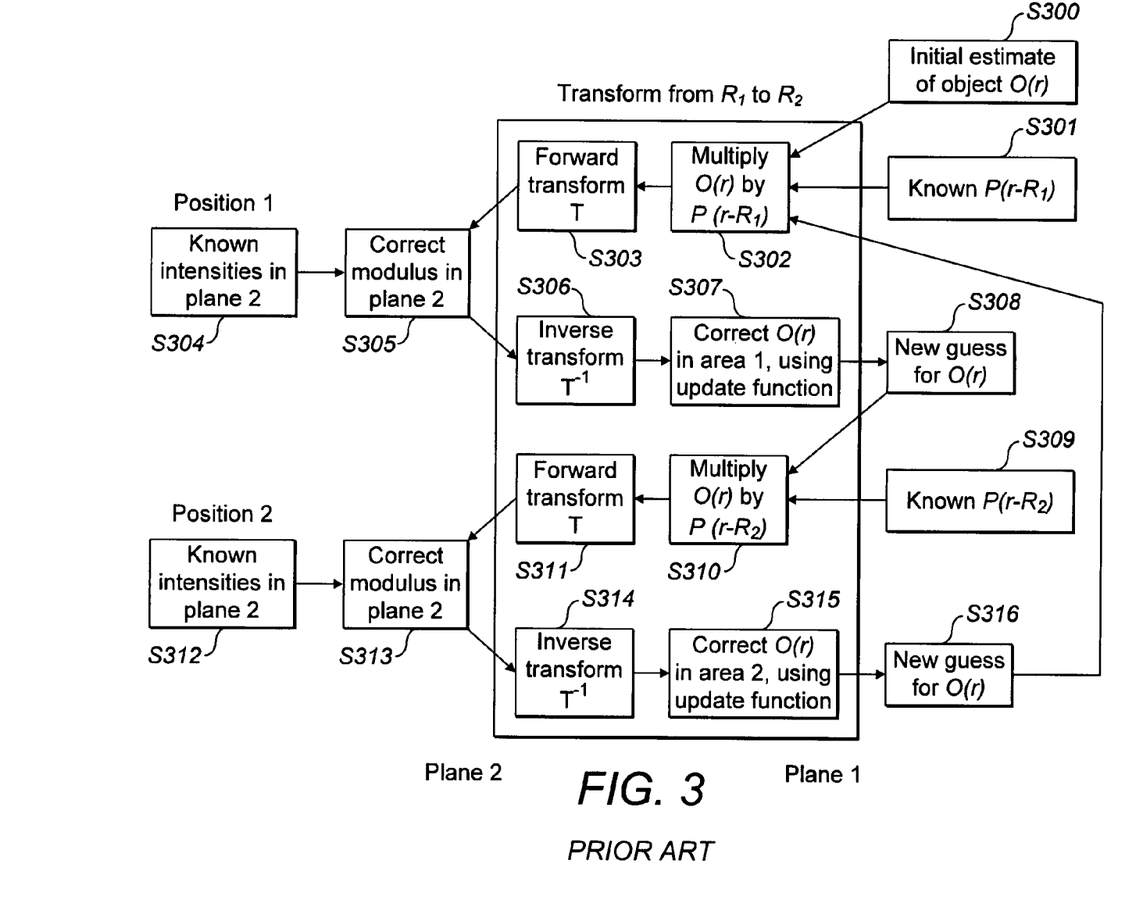
FIG. 3 shows a prior art phase retrieval algorithm.

FIG. 3 illustrates a prior art methodology for obtaining a wave function of an object and thus for obtaining image data which may be used subsequently to generate high resolution images of an object. FIG. 3 illustrates a method using the arrangement illustrated in FIGS. 1 and 2 and moving the aperture from a first position after measuring the diffraction pattern to a second position where a second respective diffraction pattern may be measured.

As noted above O(r) and P(r) represent two-dimensional complex functions, that is, each point in O(r) or P(r), where r is a two-dimensional coordinate, has associated with it a complex number. In what follows, O(r) will physically represent an exit wave that would emanate from an object function which is illuminated by a plane wave. For example, in the case of electron scattering, O(r) would represent the phase and amplitude alteration into an incident wave as a result of passing through the object of interest.

In what follows P(r) represents either an illumination function, such as that generated by a caustic or illumination profile formed by a lens or other optical component or a filtering function, such as an aperture or transmission grating mounted downstream of the object function.

It may be assumed in what follows that O(r) or P(r) can be moved relative to one another by various distances R. The nomenclature adopted is written in terms of moving P(r), although equivalently we could instead move O(r) relative to P(r). In both situations, the complex value of O(r) is altered by forming the product of O(r) with P(r−R) to give a total exit wave function of ψ(r), i.e.

$$\psi(r,R)=O(r)P(r-R) \quad (1)$$

The methodology works to find the phase and intensity of the complex function ψ(r,R). It requires as input knowledge of the function P(r−R), and one or more (preferably several) measurements of the intensity of the wave function in a plane which is different to that containing the target object 31. It is convenient to use the diffraction plane, which is related to the specimen plane by the Fourier transform. In this case the measured input data is the intensities of the diffraction patterns at one or more probe/aperture positions. However it is also possible to run the algorithm based on a set of defocused images measured at some distance from the exit surface of the specimen/aperture. In this situation the free space propagator is substituted for the Fourier transform. The algorithm is not restricted to use of these two transforms. Other effective transforms could be used to move from one plane of information to the other. In what follows a general transform T is referred to that transforms a wave function from the first plane, called plane 1, to the second plane, called plane 2.

The methodology works as follows and with reference to FIG. 3:

1. Start at step S300 with a guess at the object function Og,n(r), where the subscript g,n represents a guessed wave at the nth iteration of the algorithm. These functions are in plane 1 (which is the real space plane if the Fourier transform is used). The first guess of Og,n(r) may equal unity at all points r. This corresponds to an absent specimen. Alternatively, Og,n(r) may be set to a random values at each point.
2. A known aperture in terms of position and characteristics is selected at step S301. This provides a probe function P(r−R). At step S302 the current guess at the object function is multiplied by the aperture or probe at the current position R, P(r−R). This produces the guessed exit wave function (still in plane 1) for position R, $$\psi g,n(r,R)=Og,n(r)P(r-R) \quad (2)$$

3. Next at step S303 a transformation of ψg,n(r,R) to obtain the corresponding wave function in plane 2 (which would be the diffraction space plane if the Fourier transform is used), for that position R. Here T is used to represent some general transform that would often be the Fourier transform, but could also be the Fresnel free space propagator, or some other transform suited to a particular application of the algorithm.

$$\Psi g,n(k,R)=T[\psi g,n(r,R)] \quad (3)$$

k is the coordinate in plane 2. (For the Fourier transform, k would be the usual reciprocal space coordinate. For the propagator, k would be the xy coordinate in the defocused plane.) It is important to note that Ψg,n(k,R) is a "guessed" version of the actual wave function in plane 2, since it has been produced by the guessed object function Og,n(r). Successive iterations of the algorithm will produce increasingly accurate versions of Ψg,n(k,R). Note that Ψg,n(k,R) can be written in the form:

$$\Psi g,n(k,R)=|\Psi g,n(k,R)|e^{i\theta g,n(k,R)} \quad (4)$$

where |Ψg,n(k,R)| is the (guessed) wave function amplitude and θg,n(k,R) is the (guessed) phase in plane 2 at iteration n, for position R.

By measuring the intensity of the diffraction pattern by known techniques such as detector array 32 information about the actual transformed exit wave function are known. A measured intensity of the diffraction pattern where the aperture is in a first position thus forms the basis of an estimate of the complex wave function of the diffraction pattern. However the measured intensity does not provide information about the phase of the wave function. Rather the measured intensity is comparable to the squared modulus of Ψ(r). That is |Ψ(r)|². Once the intensity of radiation in the diffraction pattern in plane 2 is known at step S304 then the following step may be carried out.
4. Correct, at step S305 the intensities of the guessed plane 2 wave function to the known values.

$$\Psi c,n(k,R)=|\Psi(k,R)|e^{i\theta g,n(k,R)} \quad (5)$$

where |Ψ(k,R)| is the known plane 2 modulus. That is the square root of the measured intensity at the image plane.
5. Inverse transform S306 back to real space to obtain a new and improved guess at the exit wave function (in plane 1) (T⁻¹ represents the inverse of the previously used transform 7), $$\psi c,n(r,R)=T^{-1}[\Psi c,n(k,R)]. \quad (6)$$

6. Update via step S307 the guessed object wave function in the area covered by the aperture or probe, using the update function:

$$Og,n+1(r)=Og,n(r)+|P(r-R)|^l P^*(r-R)\beta(\psi c,n(r,R)-\psi g,n(r)|Pmax(r-R)|^l(|P(r-R)|^2+\delta) \quad (7)$$

where the parameters β, δ and l are appropriately chosen, and |Pmax(r−R)| is the maximum value of the amplitude of P(r). The result is a new guess for the object function (S308).

The update function helps make the effective deconvolution that occurs possible and introduces a weighting factor which causes the object function to be updated most strongly where the probe function has largest amplitude. The selectable constant l may be set to 1. It may be selected as any value in the range of 0 to 3 and need not be an integer value. It is useful to set l>1 when there is much noise. l may be selected l<1 when because of scattering geometry, the detected intensity is of the form of a Gabor hologram or similar. The value δ is used to prevent a divide-by-zero occurring if |P(r−R)|=0. δ is a small real number as is commonly applied in Weiner Filters and is usually (though not necessarily) smaller than Pmax and can be considerably smaller if the noise present in the recorded data is small. The constant β controls the amount of feedback in the algorithm, and may advantageously be varied between roughly 0.1 and 1. When β=less than 0.5, the previous estimate of the object is considered to be more important than the new estimate. Values in between vary the relative importance of the two estimates. β determines how quickly a solution is reached.

δ is a parameter which may be set at a fixed value or which may vary. It indicates how noisy the recorded data is and is used to attenuate how the updating is carried out in response to these circumstances. If good conditions exist for data collection that is to say with high beam current (high flux), which would imply low shot-noise, then it is safer to use results gathered to update the guessed estimate. Consequently the value of δ can be a small fraction of Pmax (e.g. less than ¹⁄₁₀th).

The expression:

$$\frac{|P(r-R)|^l}{|Pmax(r-R)|^l} \quad (8)$$

maximises the update effect of regions where |P(r−R)| is large. This is useful, since it is those regions which are receiving the highest amount of incident radiation, and therefore which contain information with a relatively high signal to noise ratio. This information is clearly more valuable than that from regions where very little radiation is incident, and which is heavily affected by noise.

For the situation where β=1, l=0 and δ=0, and the function P(r−R) is a mask that is can be represented by a region where its value is unity while it is zero elsewhere, or support function, the algorithm has some similarities to the well known Fienup algorithm. If in this situation, only one position R is used, then the algorithm reduces to being mathematically identical to the basic Fienup algorithm. Where more than one position R is used, the algorithm has considerable advantages over known methods, including the fact that it does not suffer from uniqueness issues, and that a wider field of view may be imaged.

Subsequent to updating the running estimate of the guess the algorithm shown in FIG. 3 progresses to selecting a new position R which at least in part overlaps the previous position. The overlap should preferably be more than 20% and is preferably 50% or more. This may be achieved by moving the aperture in the direction of arrow A shown in FIG. 1 by a predetermined amount or by causing the illuminating radiation to fall upon a different region of the target. It will be understood that image data for one location of a target object may be provided without any change in location of an aperture or incident radiation being made. In such embodiments after step S308 the algorithm returns to step S302. Instead of the initial estimate of the object function O(r) being loaded in the new guess for O(r) of step S308 is loaded in. On each iteration the new guess for the object function will approximate closer and closer to the actual object function as on each iteration information of the known intensity and thus the known amplitude component of the incident radiation is added to improve the accuracy of the estimate.

Nevertheless the more preferable method is to move to a new position R which in part overlaps the previous position as shown in FIG. 3.

A known probe function $P(r-R_2)$ at the second position is identified at step S309 and then the step as above mentioned are repeated so that the new guess generated in step S308 is multiplied with the new known probe function identified at step S309. This is illustrated in step S310. Effectively this generates an exit wave function either post specimen or post aperture depending upon the embodiment concerned. The resulting exit wave function is propagated at step S311 to provide an estimate of the scattering pattern which should be detected at that position. The diffraction pattern is measured at step S312 which provides intensity information and thus amplitude information about the transformed wave function. The intensity information is used to correct the amplitude of the transformed wave function whilst phase information is retained at step S313. This corrected wave function is inversely propagated via Fourier transformation (when the image is formed in the far field), Fresnel transformation when the image is formed at a location where Fresnel diffraction dominates or by any other suitable transformation. This is illustrated at step S314. The running estimate of O(r) is then corrected according to the update function shown above at step S315 and the result is a new guess for the object function illustrated in step S316.

At this stage further movement of the illumination or aperture may be made to a third or further position. Again a location where some overlap occurs between previous illuminated locations is preferable. In this way the whole target object may optionally be mapped. Alternatively the new guess generated at step S316 may be repeated without further positioning knowing known diffraction pattern results. In FIG. 3 the iterative method is illustrated as being repeated by returning to step S302 in which the new guess generated at step S316 is input to the multiplication stage rather than the initial estimate of the object function supplied at step S300.

The iterative method may be repeated until a predetermined event occurs. For example the iteration may be repeated a predetermined number of times, for example 1000 times or until the sum squared error (SSE) is sufficiently small. The SSE is measured in plane 2, as $$SSE = \frac{(|\psi g, n(k, R)|^2 - |\psi(k, R)|^2)^2}{N} \quad (9)$$

where N is the number of pixels in the array representing the wave function.

During the iteration process the most up-to-date guess of the object function provides a running estimate for that object function. When the iteration process is completed as determined by the occurrence of a predetermined event, the running estimate of the object function provides image data at the locations which are either illuminated by the incident radiation or which are selected by location of a post target object aperture. This image data includes amplitude and phase information which can subsequently be used to generate a high resolution image of the selected region of the target object.

Figure 4:
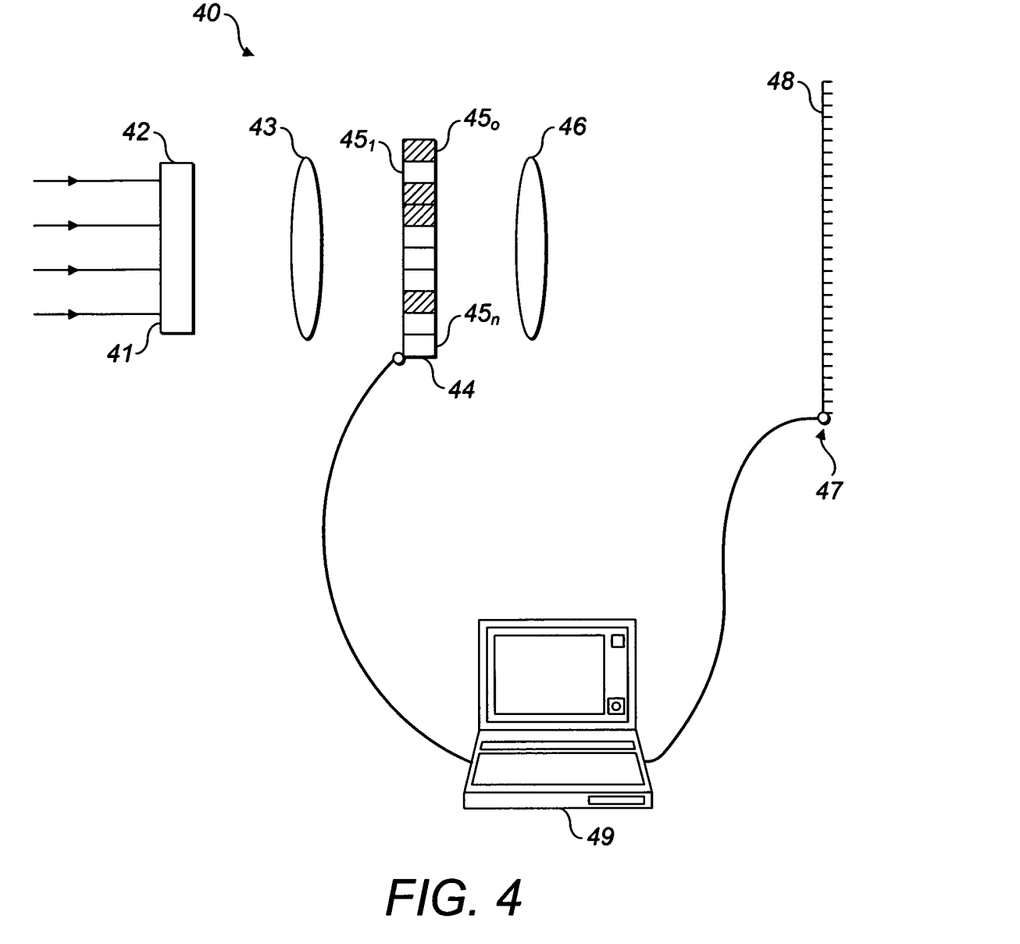
FIG. 4 illustrates an optical arrangement.

FIG. 4 illustrates an optical arrangement 40 illustrating a quantitative phase contrast microscope arrangement according to the present invention. This is achieved either as a microscope provided for such a purpose or by virtue of an "add on" lens which can be used with a conventional optical microscope. Coherent or at least partially coherent incident illumination falls on a downstream side 41 of a target object such as a sample or specimen 42. An objective lens element 43 is associated with a focal length and at that position a liquid crystal display (LCD) is located. Drive signals are connectable to turn the pixels in the LCD on or off in a random or predetermined series of patterns. The LCD array 44 and the individual pixels $45_{0-n}$ thus randomly or in a controlled manner allow illumination through at selected positions. Illumination is prevented from being transmitted through the LCD array where incident radiation falls on a pixel which is opaque and is referred to as off. Illumination is transmitted through a pixel which is transparent because of its on/off state.

A tube lens 46 is located to focus illumination on an image plane 47 where a detector 48, such as a CCD array or the like, is arranged. Scattering patterns caused by the target object and the LCD array are detected in the image plane as intensities on the light detecting elements of the image detector. Different scattering patterns can be generated in the image plane by selecting a different pixel pattern provided by the LCD 44. The pixel pattern may either be a random pattern generated by randomly generating on/off signals for the pixels in the LCD 44 or have some pseudo random or predetermined pixel pattern.

A PC 49 or some other such processing unit is used to provide drive signals to and/or receive details of on/off pixels from the LCD array 44. Also the PC 49 receives results from the detector 48. The PC 49 or a remote PC or processing unit determines data according to the following methodology. An image may be displayed responsive to the image data and may be displayed in real time or only after a sufficient number of iterations to ensure a requisite amount of detail/accuracy. Rather than, or in addition to, display an image, the image data may be used for other purposes such as analysis or recognition type steps.

The aim of the Quantitative Phase Contrast Microscope Add-On is to recover an estimate of the complex wavefront formed by a specimen illuminated by a plane-wave. The amplitude of this wavefront is proportional to the absorption of the specimen and the phase is related to changes in thickness and refractive index. The true value of the wavefront is denoted by:

$$O(\underline{r}) \quad (10)$$

whilst a running estimate is denoted:

$$O_k(\underline{r}) \quad (11)$$

where $\underline{r}$ is a displacement vector, i.e:

$$\underline{r} = [x, y] \quad (12)$$

$O_k(\underline{r})$ is updated by an iterative methodology and k denotes the current iteration. The methodology will produce a sequence $$O_0(\underline{r}), O_1(\underline{r}), O_2(\underline{r}), \ldots, O_N(\underline{r}) \quad (13)$$

where the error $$\sum_r |O(r) - O_k(r)|^2 \quad (14)$$

reduces as k→N

The interaction of the specimen with an incident plane-wave will produce a diffraction pattern in the back focal plane of an objective lens. This diffraction pattern is denoted:

$$D(\underline{u}) = \mathcal{F}[O(\underline{r})] \quad (15)$$

Where the operator $\mathcal{F}$ is a Fourier Transform and u is a second displacement vector. The inverse Fourier Transform operator is $\mathcal{F}^{-1}$. The methodology will produce a sequence of estimates of D(u) denoted:

$$D_k(\underline{u}) \quad (16)$$

The sequence of specimen guesses can be generated from the sequence of diffraction pattern guesses according to:

$$O_k(\underline{r}) = \mathcal{F}^{-1} \cdot [D_k(\underline{u})] \quad (17)$$

An LCD device is located at the back focal plane of the objective lens. Each pixel of the LCD can be switched into an 'on' or 'off' state. In the 'on' state a pixel is transparent to incident radiation and in the 'off' state opaque. A sequence of patterns is displayed on the LCD with the patterns denoted:

$$L_k(\underline{u}) \quad (18)$$

The wavefront generated by the interaction of the LCD with the incident radiation is denoted:

$$\psi_k(\underline{u}) = L_k(\underline{u}) D(\underline{u}) \quad (19)$$

A tube lens within the body of the microscope performs a Fourier Transform of $\psi_k(\underline{u})$, such that a detector at the back focal plane of the tube lens records an intensity pattern given by:

$$R_k(\underline{v}) = |\mathcal{F}[\psi_k(\underline{u})]|^2 \quad (20)$$

An initial estimate of the specimen wavefront is required to begin the methodology, this is denoted $O_0(\underline{r})$. An initial diffraction pattern guess is then generated as:

$$D_0(\underline{u}) = \mathcal{F}[O_0(\underline{r})] \quad (21)$$

Figure 5:
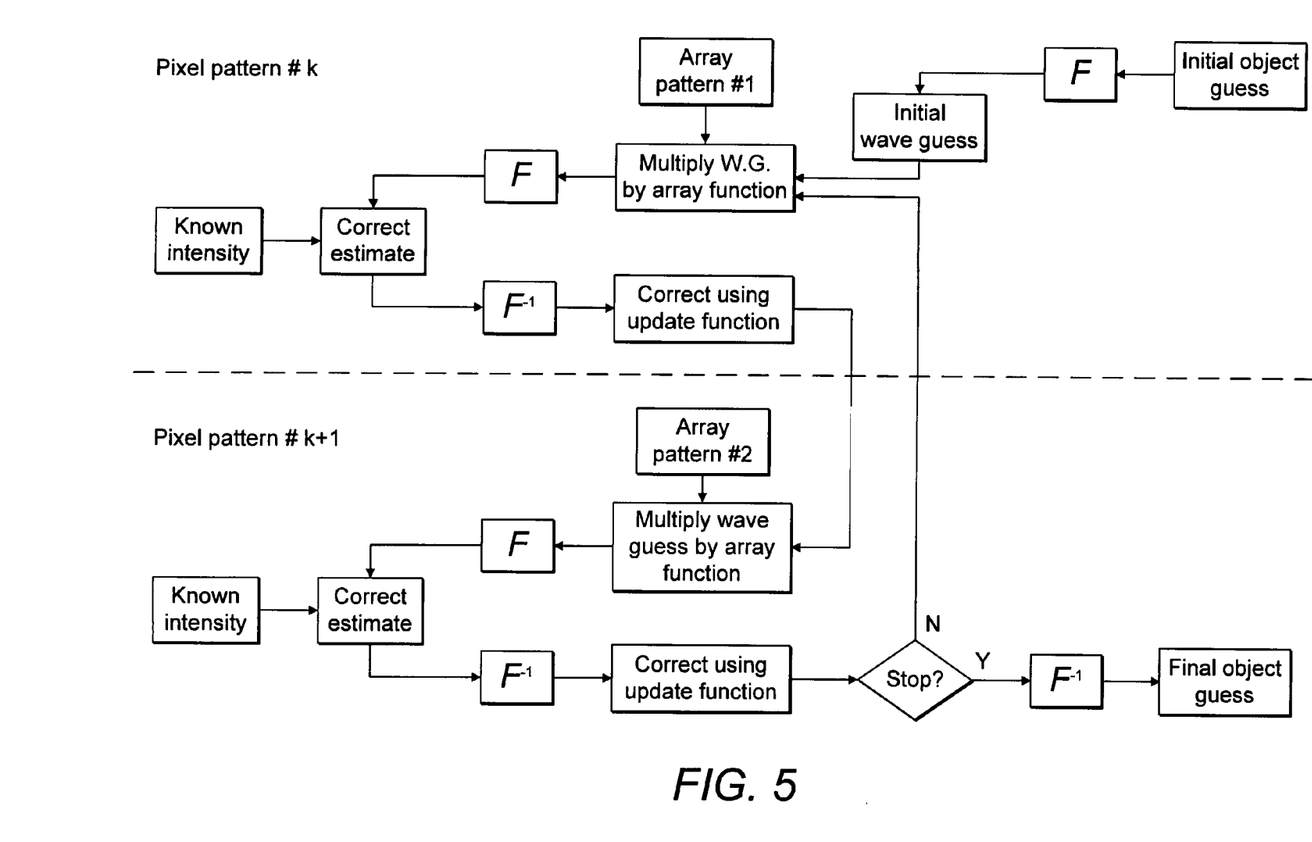
FIG. 5 illustrates an image data calculation methodology.

The next diffraction pattern $D_1(\underline{u})$ is generated according to the flow-diagram shown in FIG. 5. First an estimate of the wavefront incident at the detector is made according to:

$$R_0'(\underline{v}) = |\mathcal{F}[D_0(\underline{u})L_0(\underline{u})]|^2 \quad (22)$$

Next the amplitude of this estimate is replaced with the recorded amplitude, giving a corrected estimate as:

$$\hat{R}_0(\underline{v}) = \sqrt{R_0(\underline{v})} \exp(j \angle R_0'(\underline{v})). \quad (23)$$

where $j = \sqrt{-1}$ and $\angle R_0'(\underline{v})$ is the angle in radians of the complex function $R_0'(\underline{v})$.

An estimate of $\psi_0(\underline{u})$ is next calculated as:

$$\hat{\psi}_0(\underline{u}) = \mathcal{F}^{-1} \cdot [\hat{R}_0(\underline{v})] \quad (24)$$

and an updated estimate of the diffraction pattern extracted from this using the update function:

$$D_1(\underline{u}) = \alpha L_0(\underline{u}) \hat{\psi}_0(\underline{u}) + (1 - \alpha L_0(\underline{u})) D_0(\underline{u}) \quad (25)$$

where α is an adjustable parameter which is used to alter the step-size taken by the update function. Values of α between 1 and 2 update the estimate of the diffraction pattern rapidly but can lead to reconstruction errors. Where such errors are not desired α values less than or equal to 1 update more slowly but with improved stability.

The methodology continues in this manner with the general update function:

$$D_{k+1}(\underline{u}) = \alpha L_k(\underline{u}) \hat{\psi}_k(\underline{u}) + (1 - \alpha L_k(\underline{u})) D_k(\underline{u}) \quad (26)$$

Until the error:

$$\sum_r |O_k(r) - O_{k+1}(r)|^2 \quad (27)$$

is deemed to be small enough. Alternatively some other event can cause the method to finish. For example a preset number of iterations are exhausted.

The method provided according to the present invention thus requires neither precisely controlled optical pathways or any additional moving parts. The recorded images do not have a large dynamic range and do not take as long as conventional image data retrieval methodologies to form a reconstruction and to calculate image data.

Figure 6A:
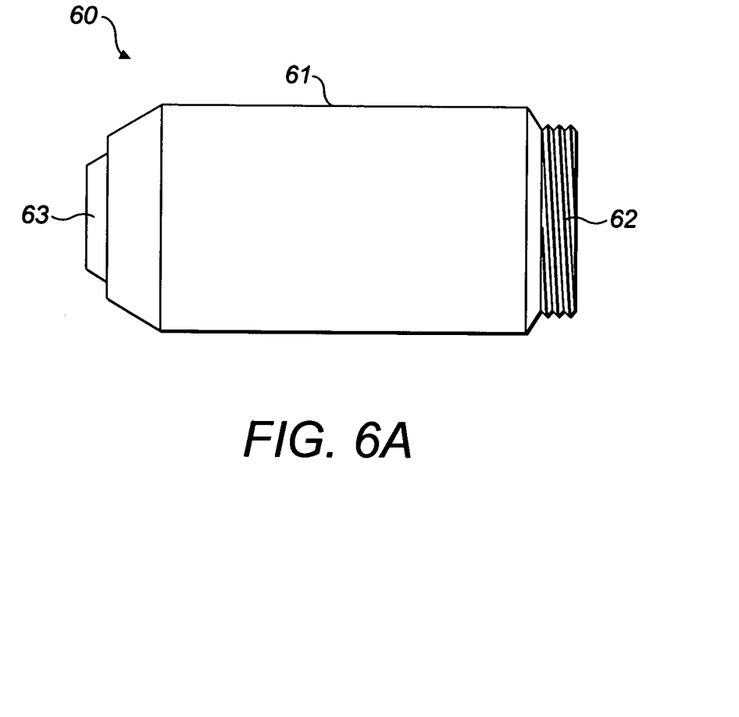
FIGS. 6A and 6B illustrate an add-on phase objective lens.
Figure 6B:
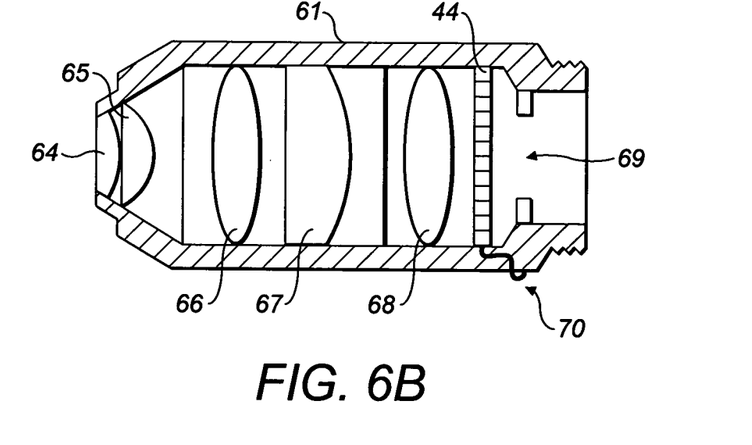

FIGS. 6A and 6B illustrate an "add on" microscope objective lens. FIG. 6A illustrates an outer view of the microscope objective 60 illustrating a substantially cylindrical central housing 61 having an RMS threaded region 62 at a back end and a front lens assembly housing 63 at a front end.

As illustrated in FIG. 6B the housing is a rigid body which includes seats for internal lens elements. The housing holds the various lens elements in a precise orientation and position.

Many different types of objective are known and it will be appreciated by those skilled in the art that embodiments of the present invention are not restricted to use with the various lens elements illustrated in FIG. 6B. By way of explanation FIG. 6B illustrates a front lens 64, meniscus lens 65, front lens doublet 66, central lens triplet 67 and rear lens doublet 68. The LCD array is arranged across the central chamber of the housing and an objective rear aperture 69 is defined at a rear region of the housing. By virtue of the threading 62 the microscope objective may be releasably secured into an existing or new microscope. Power and drive signals are provided to the LCD array via a connection 70 which can be secured to the PC 49 or other such processing element.

Certain embodiments of the present invention make use of a particular objective lens configuration which, when used with fully or partially coherent illuminating optics, provides agreeable results. According to certain embodiments of the present invention a microscope objective fitted with an LCD device located at its back focal plane is used to generate a series of images that are recorded by the CCD or equivalent digital recording device. The LCD displays a random series or predetermined series of on and off pixels. The CCD records the distorted image that is produced by the interaction of the light passing into the objective from the sample and the LCD. From a series of these distorted images an image data calculation methodology can reconstruct an image of the amplitude and phase profiles of the samples. If all of the LCD pixels are set on a conventional bright field image of the sample can be viewed and recorded enabling focusing and identification of a region of interest to be carried out in a normal way. Once this has been done one or more random or pseudo random or preset on/off patterns transmitted by the LCD and the recording of frames from the CCD is all that is required to produce desired quantitative phase images.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for selectively generating a plurality of scattered radiation patterns at an image plane of an optical microscope, comprising:
   at least one lens element;
   a liquid crystal display (LCD) array, wherein the LCD array comprises a plurality of pixel elements arranged in a grid layout, said array being connectable to a processing element adapted to selectively control a transmittance of each pixel in the grid layout; and
   a housing comprising a body portion supporting the LCD array and lens element in a predetermined spaced apart relationship.

2. The apparatus as claimed in claim 1, wherein the processing element is adapted to switch each pixel in the grid layout INTO an on/or -off state.

3. The apparatus as claimed in claim 2, wherein, in the on state a pixel element is substantially transparent to optical radiation and in the off state a pixel element is substantially opaque to optical radiation.

4. The apparatus as claimed in claim 1, wherein the arrangement of on/off pixel elements in the grid array provides a pixel pattern.

5. The apparatus as claimed in claim 1, wherein the processing element comprises a PC or laptop.

6. A microscope, comprising:
   a source of optical radiation;
   a sample holder arranged to support a target object at a sample plane;
   an objective lens housing;
   a tube lens element; and
   a detector array for detecting an intensity of radiation scattered by the target object at an image plane; wherein the objective lens housing comprises a body portion supporting a liquid crystal display (LED) array and at least one lens element in a predetermined spaced apart relationship wherein the LCD array comprises a plurality of pixel elements arranged in a grid layout, said array being connectable to a processing element adapted to selectively control a transmittance of each pixel in the grid layout.

7. A method of providing image data for constructing an image of a region of a target object, comprising the steps of:
   providing at least partially coherent optical radiation at a target object;
   via at least one detector, detecting an intensity of radiation scattered by the target object with a liquid crystal display (LCD) array, providing a first pixel pattern, located between the target object and the detector;
   subsequently, via the at least one detector, detecting an intensity of radiation scattered by the target object with the LCD array providing a further pixel pattern; and
   selectively controlling a transmittance of the LCD array to provide the first pixel pattern and the further pixel pattern;
   providing image data responsive to at least the intensity detected when the LCD array provides the first and further pixel patterns.

8. The method as claimed in claim 7, wherein said step of providing said image data comprises the steps of:
   estimating a wave function at a plane of the LCD array; and
   iteratively re-estimating said a wave function; whereby an accuracy of a running estimate of said a-wave function is improved with each iteration.

9. The method as claimed in claim 8, further comprising the steps of:
   multiplying the estimated a wave function by an array function indicating at least one characteristic of the pixel pattern provided by the LCD array;
   providing an exit wave function responsive to a result of said multiplication;
   propagating the exit wave function to provide an estimate of an expected scattering pattern; and
   correcting at least one characteristic of said expected scattering pattern according to a detected intensity.

10. The method as claimed in claim 9, wherein said corrected expected scattering pattern is corrected according to:

$$\hat{R}_k(\underline{u}) = \sqrt{R_k(\underline{u})} \exp(j \angle R'_k(\underline{u}))$$

where $\hat{R}_k(\underline{u})$ is a corrected wave function, $\sqrt{R_k(\underline{u})}$ is the known plane 2 amplitude and $R'_k(\underline{u})$ is the guessed plane 2 phase.

11. The method as claimed in claim 10, wherein propagation is calculated according to:

$$R_k'(v) = T[D_k(u)] \qquad (3)$$

where $R_k'(v)$ is guessed wave function in plane 2, T indicates a transformation and $D_k(u)$ is the guessed plane 1 wave function.

12. The method as claimed in claim 10, wherein said inverse propagation is calculated according to:

$$\psi'_k(\underline{u}) = T^{-1}[\hat{R}_k(\underline{u})]$$

where $\psi'_k(\underline{u})$ is a guessed wave function in plane 1,
$T^{-1}$ illustrates an inverse transformation procedure and $\hat{R}_k(\underline{u})$ is a corrected wave function in plane 2.

13. The method as claimed in claim 8, further comprising the steps of:
   terminating the iteration process when a predetermined event occurs; and
   subsequently estimating an object function indicating at least one characteristic of a region of the target object.

14. The method as claimed in claim 13, further comprising the steps of estimating the object function by propagating a current running estimate of said a wave function extant when the iteration process is terminated.

15. The method as claimed in claim 13, wherein said predetermined event comprises the number of iterations satisfying a predetermined condition or a calculated sum squared error satisfying a predetermined condition.

16. The method as claimed in claim 13, wherein said step of propagating comprises a Fourier transformation when the detected intensity is detected at the far field or a Fresnel propagation when the at least one detector is at a distance from said LCD array where Fresnel diffraction dominates.

17. The method as claimed in claim 8, further comprising the steps of:
   inverse propagating the corrected expected scattering pattern to provide an updated exit wave function; and
   updating the running estimate of said a wave function responsive to said updated exit wave function according to the function:

$$D_k+1(u)=\alpha L_k(u)\hat{\psi}_k(u)+(1\alpha L_k(u))D_k(u)$$

where $\alpha$ is a feedback, $D_{k+1}(u)$ is a running estimate of said a wave function, $D_k(u)$ is a preceding estimate of said a wave function or is unity when there is no preceding estimate, $\psi_k(u)$ is a corrected guess at an exit wave function and $L_k(u)$ is the current liquid crystal display (LCD) pixel pattern.

18. The method as claimed in 17, further comprising the steps of selecting said further pixel pattern so that a transmittance area determined by said first pixel pattern overlaps at least partially with a further transmittance area determined by the further pixel pattern in a second position.

* * * * *